US007756507B2

(12) United States Patent
Morper (10) Patent No.: US 7,756,507 B2
(45) Date of Patent: Jul. 13, 2010

(54) METHOD AND DEVICE FOR AUTHENTICATED ACCESS OF A STATION TO LOCAL DATA NETWORKS IN PARTICULAR RADIO DATA NETWORKS (75) Inventor: Hans-Jochen Morper, Erdweg (DE)

(73) Assignee: Siemens Aktiengesellschaft, Munich (DE)

( * ) Notice: Subject to any disclaimer, the term of this patent is extended or adjusted under 35 U.S.C. 154(b) by 797 days.

(21) Appl. No.: 10/493,489

(22) PCT Filed: Oct. 24, 2002

(86) PCT No.: PCT/EP02/11910

§ 371 (c)(1),
(2), (4) Date: Oct. 18, 2004

(87) PCT Pub. No.: WO03/036904

PCT Pub. Date: May 1, 2003

(65) Prior Publication Data
US 2005/0048950 A1 Mar. 3, 2005

(30) Foreign Application Priority Data
Oct. 24, 2001 (DE) ............... 101 52 572
Oct. 24, 2001 (EP) ............... 01125257

(51) Int. Cl.
H04M 1/66 (2006.01)
H04M 11/00 (2006.01)
H04B 1/38 (2006.01)
(52) U.S. Cl. ............ 455/410; 455/558; 455/405
(58) Field of Classification Search .......... 455/411, 455/410, 405, 558, 466, 414.1; 370/329; 380/247; 340/5.74; 726/2; 705/40
See application file for complete search history.

(56) References Cited

U.S. PATENT DOCUMENTS 5,239,294 A * 8/1993 Flanders et al. ............ 340/5.74
5,282,250 A * 1/1994 Dent et al. .................. 380/247
5,493,283 A * 2/1996 Hopper et al. ............... 340/5.8

(Continued)

FOREIGN PATENT DOCUMENTS

DE 44 09 178 A1 9/1995

(Continued)

OTHER PUBLICATIONS

Siemens AG. "Integration of Hicom and Wireless LAN," located at <http://w4.siemens.de/en2/html/press/edesk/2001/aehm_071_01_ppt.ppt> (4 pages).

(Continued)

Primary Examiner—Charles N Appiah
Assistant Examiner—Kiet Doan
(74) Attorney, Agent, or Firm—King & Spalding L.L.P.

(57) ABSTRACT

The invention relates to methods, devices and systems for the authenticated access to a data network by means of a station (WH) compatible with a data network (WLAN), which permit an authentication of the station and user. A device, for example a mobile radio device, is used for the above, which is authenticated in another system. In addition to the authentication, in particular a charging of services in a data network or another communication system (GSM) which is accessible by means of the data network is thus possible.

10 Claims, 3 Drawing Sheets

U.S. PATENT DOCUMENTS

| | | | |
|---|---|---|---|
| 5,553,315 A * | 9/1996 | Sobti et al. | 455/509 |
| 5,729,537 A * | 3/1998 | Billstrom | 370/329 |
| 5,745,884 A | 4/1998 | Carnegie | |
| 5,859,967 A | 1/1999 | Kaufeld et al. | |
| 5,930,777 A * | 7/1999 | Barber | 705/40 |
| 5,933,773 A * | 8/1999 | Barvesten | 455/411 |
| 5,991,616 A | 11/1999 | Mirza | |
| 6,078,908 A | 6/2000 | Schmitz | |
| 6,091,945 A * | 7/2000 | Oka | 455/411 |
| 6,112,078 A * | 8/2000 | Sormunen et al. | 455/411 |
| 6,230,002 B1 * | 5/2001 | Floden et al. | 455/411 |
| 6,405,030 B1 * | 6/2002 | Suprunov | 455/410 |
| 6,662,005 B1 * | 12/2003 | Palvianen | 455/414.1 |
| 6,738,636 B2 * | 5/2004 | Lielbriedis | 455/466 |
| 7,174,564 B1 * | 2/2007 | Weatherspoon et al. | 726/2 |
| 2002/0034939 A1 * | 3/2002 | Wenzel | 455/411 |

FOREIGN PATENT DOCUMENTS

| | | |
|---|---|---|
| DE | 4495639 T1 | 10/1996 |
| DE | 197 57 631 A1 | 8/1998 |
| DE | 19722424 C1 | 8/1998 |
| DE | 197 12 473 A1 | 10/1998 |
| DE | 299 20 057 U1 | 3/2000 |
| DE | 69800710 T2 | 11/2001 |
| EP | 1107089 A1 | 6/2001 |
| EP | 1 191 736 A2 | 3/2002 |
| WO | WO-00/44130 A1 | 7/2000 |

OTHER PUBLICATIONS

Mobile Business: High-Speed Convenience for Business Travlers . . . , Apr. 24, 2001, pp. 1-7.

* cited by examiner

METHOD AND DEVICE FOR AUTHENTICATED ACCESS OF A STATION TO LOCAL DATA NETWORKS IN PARTICULAR RADIO DATA NETWORKS

CLAIM FOR PRIORITY

This application claims priority to International Application No. PCT/EP02/11910, which was published in the German language on May 1, 2003, which claims the benefit of priority to German Application No. 101 52 572.9 and European Application No. 011 25257.4, which were both filed in German and European languages, respectively.

TECHNICAL FIELD OF THE INVENTION

The invention relates to a method for accessing a data network and to a device for implementing such a method and to a charging method as a result of the authentication.

BACKGROUND OF THE INVENTION

A large number of different types of telecommunications and data networks for communicating and/or transmitting data are known. A distinction can be drawn here between two fundamentally different types of network. There are, on the one hand, the telecommunications networks, for example those conforming to the GSM (Global System for Mobile Telecommunications) or the UMTS (Universal Mobile Telecommunications System) standards, in which subscribers are authenticated and authorized when they sign on to the network concerned. An advantage in networks of this type is that as a result of the authentication procedure it is also possible to charge for services used. Furthermore, these generally cellular networks offer the opportunity of a high degree of mobility since a subscriber can move with his/her station from network cell to network cell. A disadvantage of these types of cellular telecommunications systems is that the administrative outlay is very high. Also, these telecommunications networks provide only a low data rate for radio interfaces.

There are, on the other hand, data networks which are designed as local area networks or wireless local area networks (WLAN). Such data networks offer subscriber stations access that is very easy to administer. A further advantage consists in the considerably higher data rate by comparison with telecommunications networks at the interfaces to the subscriber station. A disadvantage of data networks of this type, however, is the lack of an authentication facility and consequently also the lack of a billing or charging facility.

Currently, especially in the USA and Europe, it is almost exclusively products based on the IEEE 802.11 family which appear to be prevailing as local area networks with wireless subscriber access, with suitable Ethernet terminals already being provided as standard in many computers and portable computers (laptops, notebooks, PDAs, etc.). The radio interface defined under the IEEE 802.11b standard for accessing local area networks corresponds functionally to a wired connection to LANs which have now developed into the office standard. Interface cards for wireless access to local area networks, also referred to as NICs (network interface cards), are from an architectural point of view produced like standardized Ethernet cards and with today's operating systems can be installed using plug & play. Portable computers are readily upgradeable with appropriate interface cards unless they have already been delivered ex works with an integrated terminal for wired or wireless access to local area networks. With the next generations of operating systems (e.g. Windows XP from Microsoft) fully integrated support for wireless local area networks will be provided.

With data rates of 11 Mbit/s at present and of 50 Mbit/s in future, subscribers will thus be provided with data rates that are considerably higher than the data rates which can be offered by the next third-generation mobile telecommunications (UMTS). Access to wireless local area networks for high-bit-rate connections is consequently preferable for transmitting large quantities of data, especially in connection with Internet access.

Disadvantageously, the wireless local area networks cannot offer any authentication facility for stations or computers not already registered in the system. However, operators of wireless local area networks, for example in an airport area, have to offer access for a large number of different subscribers from different regions. In order to be able to authenticate a subscriber, the operator of the wireless local area network would have to conclude cross-license agreements with all possible Internet service providers (ISPs), of which, however, there are currently over 60,000 in Germany alone.

Without authenticating subscribers or subscribers' stations, no billing of services used can occur since it is not even known to whom a bill could be sent. Access to wireless local area networks must therefore either be offered free of charge or as a prepaid service with payment in advance by means of credit card billing or the like.

A further facility enabling authentication and billing consists in involving a billing company or clearing house which takes responsibility for the relevant contacts with as many Internet service providers worldwide as possible. A problem here, however, is that a large proportion of the revenues of the operator of a wireless local area network has to be transferred to the clearing house. Furthermore, the clearing house has to succeed in being able to contact each actual Internet service provider or at least a large number of Internet service providers, i.e. in concluding a large number of contracts itself. This solution, too, is consequently very difficult to manage. With regard to unauthorized access to data networks there is also increasingly the problem that unauthenticated content is being provided by subscribers of wireless local area networks. Only authentication could prevent extremist information or information that jeopardizes young people from being retrieved via the local area networks concerned and via access to the Internet.

These problems can be solved by the operators of the mobile communications networks in a simple way. The cellular mobile communications networks have a large subscriber base that can be authenticated. Furthermore, these mobile communications networks have an accounting or billing system. By means of international roaming, subscribers who are registered or subscribed with another mobile communications network operator can also be serviced and authenticated. Since nowadays a majority of consumers in industrialized countries are mobile telephone subscribers, a mobile communications network operator can in principle contact virtually every consumer itself or with the aid of other mobile communications network operators.

Initiatives as to how a mobile communications network operator can integrated wireless local area network into its own cellular mobile communications network are many and various. As the debate stands at present, a distinction is drawn between tight and loose coupling. Tight coupling is defined as full UMTS integration, i.e. one uses only the physical layer of the wireless local area network, while all higher protocol layers are taken over from UMTS and adapted. This solution is meanwhile no longer under discussion as it has proven not to make economic sense and to be technically difficult to implement.

Among the variants of loose coupling currently being debated publicly are the two infrastructure-based coupling variants (e.g. ETSI BRAN) which are based on the use of a registered identification card (SIM: subscriber identification module) or the RADIUS PROTOCOL (RADIUS: Remote Access Dial-In User Access). In the case of the SIM-based variant, a SIM card is installed in a notebook or a network access card for said notebook. The wireless local area network system appears logically as a visitor local register (VLR) of the telecommunications network and is connected to the telecommunications network via the MAP (mobile application part). Economic success for the operator of the telecommunications network depends greatly, however, on whether in future every card for accessing wireless local area networks will contain a SIM card as standard. For this to occur, computer manufacturers and the standardization bodies for data networks and telecommunications networks would have to develop joint standards or a mobile communications network operator would have to subsidize this specific type of NIC.

In the case of the RADIUS variant, the telecommunications network appears as an authentication, authorization and accounting server, as a result of which no modification of subscriber equipment is necessary.

With regard to currently available hardware, access points (AP) which are based on the IEEE 802.11b standard are known, as analog modems for connecting to a telephone line, as ISDN cards for connecting to an So bus, as DSL modems for connecting to a DSL line, topologically as Ethernet bridges with a local area network terminal for connecting to a local area network and in further embodiments as a cable modem for connecting to a cable television network and as a router, for example with an Ethernet terminal without a bridge function. These access points consist of a radio access section for controlling access to the radio interface and an interface for connecting to the wired telecommunications or data network. The radio access section and the interface for the line-bound terminal are connected with hardware which also provides appropriate configuration management functions, etc.

SUMMARY OF THE INVENTION

The invention provides a method and device for authenticated access to local area networks, in particular wireless local area networks, which simplify the authentication and in particular facilitate the possibility of charging for services used with the aid of the local radio network.

In one embodiment of the invention, there is a charging method for stations compatible with a data network, a data network unit, a network access device and charging systems.

Authenticated access is defined as access to a data network, data or the like, where the accessing station or the operator thereof can be identified directly or indirectly. Data networks are local area networks in accordance with e.g. IEEE 802.11 or HiperLAN2. Stations compatible with a data network are accordingly computers, notebooks and the like which have a cable or wireless interface to such a data network. Access points, which are deemed to include hubs, bridges, network cards in computers and the like, serve as access for such a data network.

The identification information can be a device number, an assigned telephone number, a password-type character string and the like, which are assigned to the station or the operator thereof. The identifier, e.g. a password, is provided on the other hand by the data network unit triggering authentication. The transmission path of a short message, a call or the like is listed for example as a path to an authenticated device that is protected against manipulation. The transmission of characteristic information to the access point or data network can occur e.g. by reading of a mobile telephone display, fax or the like by persons or else automatically by infrared interfaces or cable connections.

For determining the authenticity of a subscriber or of a subscriber's station, a method is particularly advantageous in which characteristic information is transmitted by the data network over a secure path to a device external to the data network having authentication of subscribers or subscriber stations. The subscriber can transfer the characteristic information received on such a device manually after it has been shown on a display or by an automatic interface, e.g. via a cable connection or an infrared connection to the mobile host or computer. By this means, access can be gained on the one hand to secure authentication information of another system, of which at least the access code of the uniquely assignable device of the system with authentication is known in the data network. Advantageously, however, access does not have to be directly with further network-internal devices of the other system with the authentication function. The data network and the other system with an authentication function thus remain fully decoupled and enable nonetheless secure authentication of the mobile host or of the station with which the data network is being accessed, since the operation of this station can be carried out by a uniquely authenticatable subscriber in the other system.

Advantageously, the identifier is randomly generated in the access point of the data network or of another device of the data network from the available standard character set. However, it is also possible for an identifier to be selected from a list containing a large number of passwords so that, to simplify transmission, words in users' normal vocabulary can be used.

The transmission of the identifier to the device in the system with authentication can be carried out particularly easily by using the short message service (SMS). This procedure can readily be implemented for data network access in current and future cellular telecommunications systems with a very large distribution in the relevant user groups. The transmission of the identifier without any direct use of authentication functions in the system external to the data network is thus preferably understood as meaning that the operator of this external network enables a data transmission comparable with a normal telephone call or a short message transmission.

The transmission of the identifier advantageously occurs without any direct use of the actual authentication functions in the system external to the data network.

Direct communication with one or more of the devices and functions of the external system is not necessary.

It is particularly advantageous here for the identifier to be transmitted via a mobile station and/or a SIM card of a cellular mobile communications system.

After the authentication of the subscriber or of the station accessing the data network, a recording can be undertaken in the data network itself of data relevant to charging when the station accesses a certain service or for a certain period of time via the data network. Advantageously, data relevant to charging that is recorded in this way can be passed in accordance with a method having an independent inventive embodiment through to a separate central charging office or to a charging center of the system external to the data network.

Methods of this type can be implemented in particular with a local area network or wireless local area network if, in addition to being equipped with an interface for access by a subscriber's station, an access control unit having usefully an authentication memory and a first interface for access from the data network to an external network, this network is also equipped with a special access control unit for generating an identifier and for emitting this identifier via the external network. The identifier can be transmitted via a second network device interface from the external network to the station connected to the data network, simultaneously enabling authentication of the station by the access control unit.

Obvious solutions for implementing such a method in a data network equipped in such a manner are, in particular, modems and network access devices which have appropriate interfaces to the data network, e.g. an Ethernet terminal, and to the external network, e.g. a telephone line, as well as appropriate hardware and software for implementing an appropriate authentication procedure.

Advantageously, such an access control unit has the devices and functions necessary for authentication as well as an interface module, the interface module being designed as a modular device for connecting to at least one external communications system or communications network with secure authentication so that replacing the interface module makes it possible to adapt to various types of external networks without any major structural outlay.

In the other external communications system or communications network with an authentication function, few or no changes are required. Since, with regard to the authentication of a subscriber station accessing a wireless local area network, this communications system or communications network is used for carrying information relevant to authentication, no additional outlay is incurred with regard to subscriber authentication in this external network. The transmission of charging information from an access control unit of a wireless local area network to another external communications system sensibly occurs in the format and via the interfaces which are customary for the transmission of charging-relevant information within this network or to this network.

Adaptations to different payment systems can take place either in the external network or else in the wireless local area network.

The implementation of this method or the introduction of appropriate technical equipment is possible with minimum outlay. In particular, even very small local area networks or wireless local area networks can be included so that the sum total of many small and very small installations form a complete network which potential wireless data network customers can access. In such scenarios, no principal operator incurring a major financial risk is required, and the investments of the individual access providers, for example, hairdressing salons, restaurants, airport operators are limited due to the ease of implementation. In particular, this also enables mobile communications network operators to access such markets, the mobile communications network operators themselves being able to provide appropriate access to the data network or to render third parties' data network access usable for themselves.

In essence, simple, commercially available mass-produced goods which can be obtained by the owners of portable computers and the like at low cost are used for installation. On account of the limited additional functions and additional equipment required at the data network access points, the installation costs are also low for the data network operator and, at less than 500 euros plus monthly Internet access fees, affordable. Even if no charging is undertaken, the use of such a system is advisable in terms of potential customer relations.

Charging methods can be apportioned particularly well to different systems if basic charging information is recorded in a first charging unit which can be provided cost-effectively and transmitted to a more cost-intensive but in return centrally operable second charging unit which, from the basic charging information, determines fees to be charged.

Areas of application are, due to the use of the unlicensed radio frequency band, private properties, businesses and divisions of companies. While in known systems prior registration and, in the case of charging, the involvement of charging companies or entities was necessary, under the method presented, authentication and consequently unique subscriber identification can be carried out if the data network can access another system or network with the appropriate information. In particular, the copyright status of contents in the network can thus also be checked.

The access to cellular telecommunications networks is particularly advantageous since the mobile communications network operators possess the world's largest current subscriber base, use the world's most accepted current form of subscriber authentication and in their charging platform possess a simple collection system for third parties.

A further advantageous feature lies in the fact that although the mobile communications network operator itself has fully transferred responsibility for authentication of the access of subscribers and subscriber devices to a third-party service provider, it can e.g. with modems or network access devices supply precisely the mechanisms which enable this service provider to carry out this authentication securely and reliably in the easiest way.

On the hardware side, it is particularly advantageous to supply the appropriate equipment in the form of a modem, since a subscriber has only simple connections to make and can install the device such as a normal modem for access to a telecommunications network himself/herself easily and without any major technical outlay.

Particular advantages consequently lie in the fact that two different types of network complement one another in that a high-bit-rate data network can indirectly access functions of a low-bit-rate telecommunications network with authentication functions. A data network, in particular a wireless data network, can thus autonomously carry out authentication of a subscriber's station and be connected to various networks for this purpose. The connection to external networks can be such that, from the viewpoint of the external network, a station belonging to that network is accessing or an external device is accessing a standard interface provided for this external device.

Mobile communications network operators can offer third-party data network providers connection to their payment system and thus with minimum outlay also offer their mobile subscribers access to local area networks without being forced themselves to set up access points for data networks.

In this context, the connection of access control units of wireless local area networks to charging and/or payment systems is advantageous. These systems find use in telecommunications networks, above all however in cellular mobile communications networks when charging information is to be transmitted from service providers outside the network. In this way it is, for example, possible to invoice for the purchase of articles over the mobile communications network. In such a case, the seller of articles uses the subscriber status of the customer with a mobile communications network operator so that the purchaser can then settle his/her account via his/her mobile communications network operator rather than, for example, via a credit card. Thus, the seller uses the collection functions which mobile communications network operators provide to third-party service providers. In this process, the seller is under obligation toward the mobile communications network operator to ensure that only charging information from fully authenticated subscribers is transmitted. Arrangements to this effect can be regulated e.g. in a contract such that the user (seller) of charging services of a mobile communications network operator be basically liable for the sums of money used. Using these methods, known in the art in other areas, which find use in commercial payment systems, e.g. the Siemens Pay@Once system, it is possible for a mobile communications network operator not only itself to offer services subject to a charge but also to arrange for its mobile communications customers to be offered additional services by third-parties, companies not belonging to the mobile communications network operator (untrusted partners).

A key advantage of the method described consists in the fact that chargeable access to a local radio network can be offered by third parties, whose charging is carried out via the mobile communications network, without the mobile communications network operator itself having to provide the devices such as base stations necessary for radio-based local wireless network access.

A mobile communications network operator can thus provide its customer with access to data networks even where this service is already being offered by another third party. It can sell or donate the devices and functions required to the third party.

Third-party operators, e.g. content providers, can be motivated to offer access to local area networks themselves since these third-party operators can in a simple way utilize the authentication and collection facility of a mobile communications network.

An independent authentication procedure can usefully be used for the authentication of the data network operator to a third party as the charging center or the like.

BRIEF DESCRIPTION OF THE DRAWINGS

Embodiments will be described in detail below with reference to the drawings, in which.

DETAILED DESCRIPTION OF THE INVENTION

Figure 1:
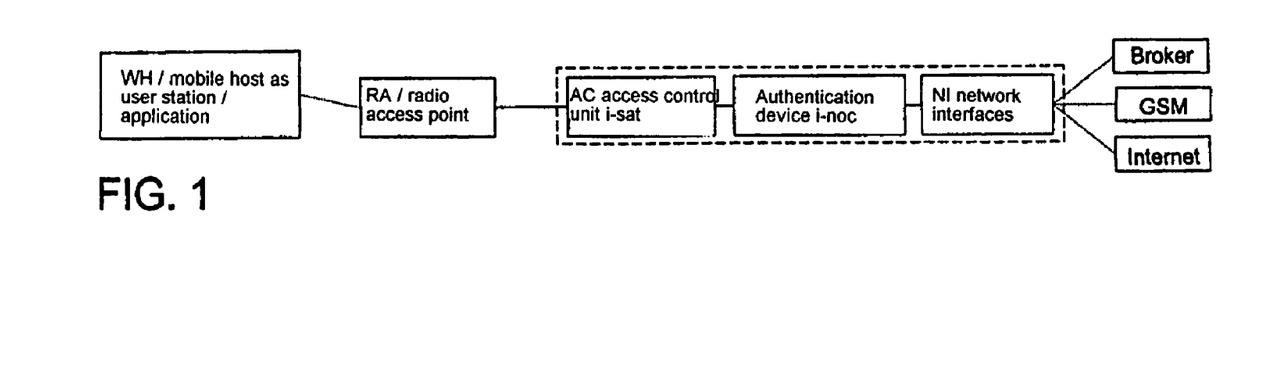
FIG. 1 shows components of a data network with a facility for accessing an external, authentication-capable communications system.

Referring to FIG. 1, a sample local area network, in the preferred embodiment a wireless local area network WLAN, includes a large number of devices which are connected to one another by means of appropriate lines. The devices include routers and bridges for distributing data to a large number of network devices. While this type of local area network WLAN can be operated even without a controlling network device if the connected stations, in particular hosts, computers and the like possess an appropriate functionality for controlling access, in the preferred embodiment the local area network has a DHCP server for allocating temporary addresses in accordance with the Internet Protocol (IP).

This DHCP server can be connected directly to a network line or an access router AR or be part of such an access router.

The local area network also has access points AP for the access of wireless stations to the local area network. Such wireless stations can be computers, notebooks and the like which are equipped with a radio interface, for example an NIC (Network Internet Card), i.e. a network access card. Consequently, communication takes place from the station via its network access card NIC and the radio interface V1 configured at one of the access points AP to the wireless local area network WLAN.

As an additional component, the wireless local area network WLAN has a network interface NI which enables access to a communications network with Internet access. The network interface here can advantageously be connected to the access router AR or also integrated in this access router. Integration is, however, also possible in another computer or the like connected to the wireless local area network WLAN.

In the method described below for the loose coupling of a wireless local area network WLAN to a mobile communications network, in the embodiment shown a mobile communications network that conforms to the GSM standard, further devices and functions are accessed. Here, authentication and charging are decoupled both from one another and from direct communication with the external GSM network or system. The relevant architecture of a preferred wireless local area network system is shown in the symbolic representation sketched below the graphical representation of the network, which can be coupled to a variety of networks as a result of the decoupling of authentication and charging. Access to PLMN HLR/HSS (Public Land Mobile Network Home Location Register/Home Subscriber System), electronic trading systems (eCommerce), ISP AAA (Internet Service Provider Authentication Authorization Accounting), intelligent micropayment network systems (IN micropayment systems), etc. are mentioned as examples in addition to access to the GSM.

The connection of these different systems or networks to the data network WLAN is via a network interface which has an appropriate interface module. The remaining blocks shown in the diagram can be used unchanged for the various external networks or external systems. Here, the generic modules include a user station or user application, e.g. a notebook with a wireless network card and an Internet browser, a radio access unit, e.g. a radio access point conforming to IEEE standard 802.11b which is connected to a local area network LAN, an access control unit or access control function which recognizes whether a subscriber is already authenticated or not and which if necessary enforces authentication, and an authentication function or authentication unit which carries out the authentication. Furthermore, a charging function or a charging system can be provided, which charging information generates, based on the period of service use, the quantity of data transmitted or the type of service used, subscriber-dependent billing datasets. Such functions and systems can, however, also be included in the network interface.

The generic modules and functions can be used unchanged both in terms of their logical functions and with regard to their physical entities. The term 'generic' is thus deemed to refer, in particular, to a unit which in terms of its physical design and its logical function can be used unchanged, independently of an external system to which this generic device is connected. The individual devices and functions can be provided here as devices and functions separate from one another, can be components of other network devices or else be combined in a device referred to hereinafter as a service selection gateway SSG. The authentication function is designed in the embodiment described below to be provided by a network server or web server.

Figure 2:
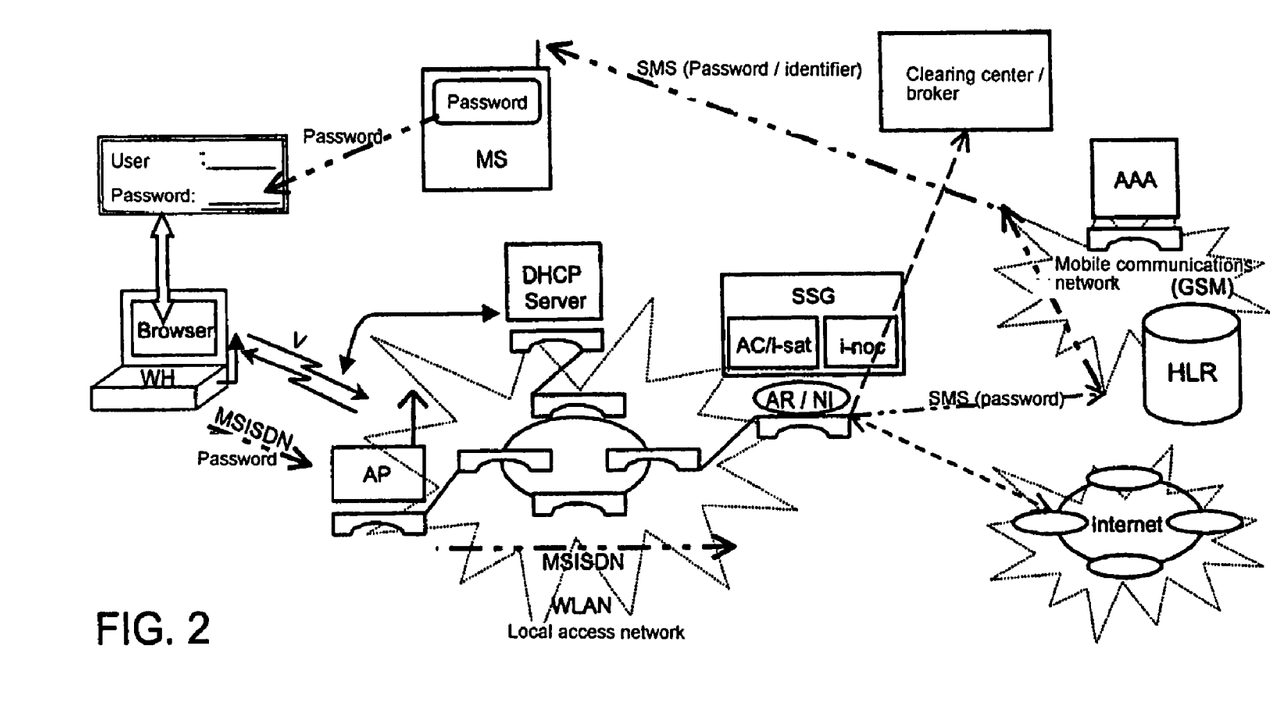
FIG. 2 shows the sequence of an authentication method in the system.
Figure 3:
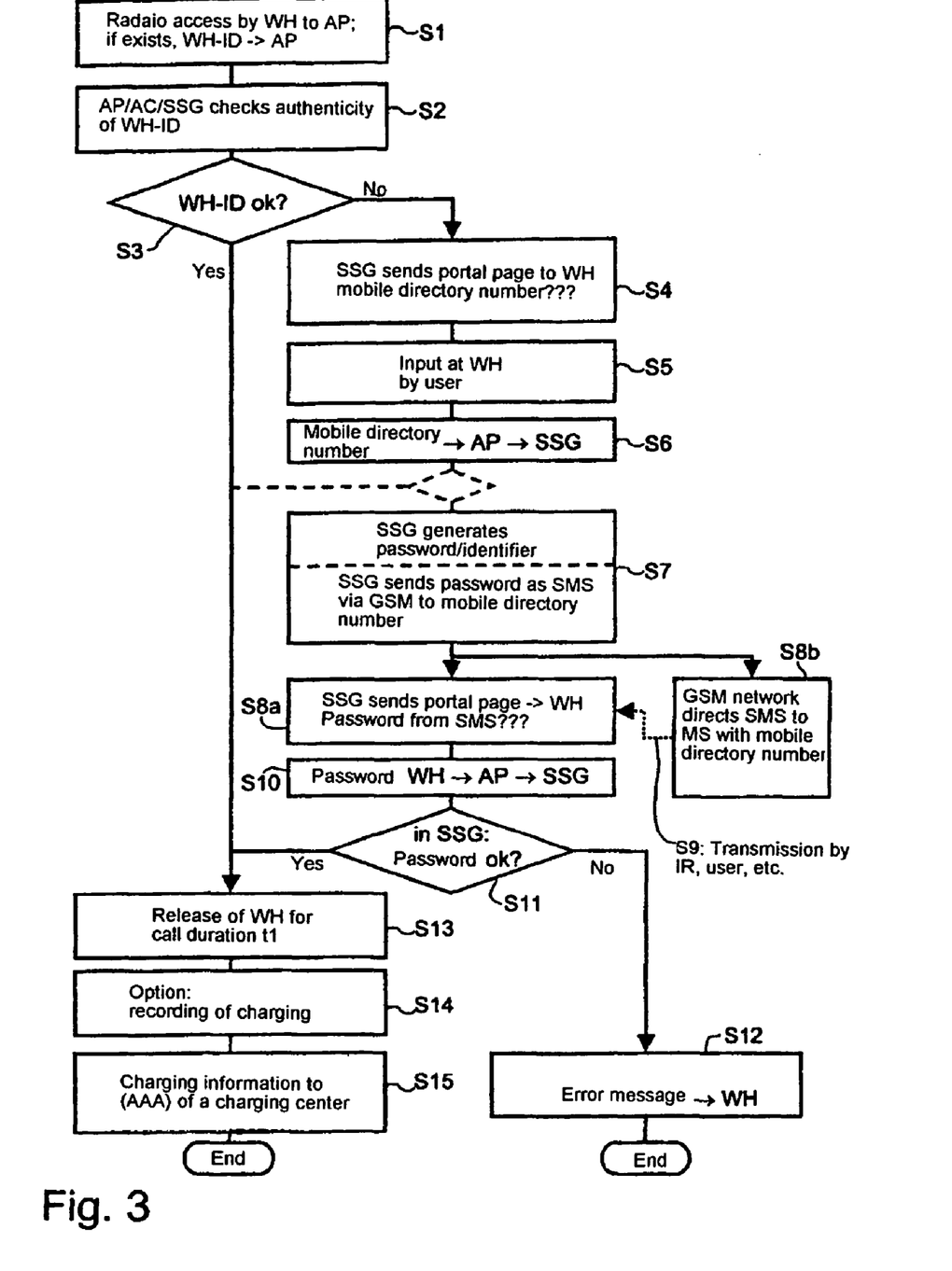
FIG. 3 shows diagrammatically a flowchart of the method.

The sequence of operations in the accessing of a network by a station WH and the corresponding authentication of this station or of the user assigned to this station is also described with reference to FIGS. 2 and 3. In a first step S1, the subscriber's station WH obtains via the radio interface V1 a wireless access to the access point AP of the wireless local area network WLAN, which is installed for example at an airport. After the assignment by the DHCP server of an IP (Internet Protocol) address to be used for access by the station WH in accordance with standardized functions for local area networks, the authentication is triggered when a service, e.g. Internet access, is accessed for the first time using the IP address or the globally unique MAC (Medium Access Control) address specific to the network access card.

The access control function or access control unit has a memory in which a list is held scheduling which IP addresses WH-IP or MAC addresses WH-MAC are already listed as authenticated subscribers or authenticated subscriber stations (step S2).

If it is ascertained in a step S3 that the checked IP address WH-IP or MAC address WH-MAC belongs to a previously authenticated subscriber or subscriber terminal, access to the required services which are being offered with the aid of or by the local area network is cleared. Otherwise, access can, for example, be restricted to free local services, for example departure boards at airports, or any data access disabled or a fresh authentication procedure started.

For non-authenticated IP or MAC addresses, the service selection gateway SSG or the access control unit located therein imports in place of the required Internet page a portal page which prompts the subscriber or operator of the station WH to enter unique identification features, e.g. username and password. These parameters are used for authentication. If this is successful, then the access control function is instructed to clear the subscriber, i.e. to allow him/her access to the required Internet page, so that the subscriber has free access to the required service or the Internet.

When the portal page is transmitted in a step S4, in particular an access number for a telephone, in particular a cellular telephone of the subscriber, can be requested in addition to or instead of the unique identification features. After the access number or telephone number (mobile directory number) has been input in a step S5 by the subscriber or operator of the station WH, the identification number or telephone number is sent via the access point AP to the service selection gateway SSG in a step S6.

In a subsequent step S7, the service selection gateway generates, in the event that authentication is possible with the details given but a telephone number of this type is specified, a password. The password is transmitted as an identifier to the appropriate telephone via the appropriate communications network assigned to the telephone number. Other suitable data terminals, for example fax machines, can be used instead of a telephone. It is essential that the identifier be transmitted via a telecommunications network, data network or system which permits a unique and reliable assignment of subscribers, in which network or system a certain person is uniquely assigned to the specified telephone number as a subscriber or as a certain data terminal. The identifier can and is directed to this person.

In the embodiment shown, the identifier is transmitted in a step S8b as a short message service SMS via a telecommunications network to a mobile station, in particular a cellular telephone of the GSM network with the assigned mobile directory number MSISDN. In parallel with this, a password request is sent in a step S8a as a portal page to the station WH.

In a next step S9, the subscriber reads off the identifier from his/her cellular telephone and inputs said information into his/her station WH. After it has been confirmed, the identifier or this password is sent in a step S10 by the station WH via the access point AP to the service selection gateway SSG.

In the next step S11, a check is made in the service selection gateway SSG as to whether the identifier or the password matches the password originally generated and issued or has been changed in a permissible manner, for example, by means of encryptions. If not, an error message is output in step S12 to the station WH and the procedure terminated or a repeat request for authentication information is initiated in step S4.

If in step S11 the identifier is ok, the station WH is cleared in step S13 for the requested or permitted access to special services and/or the Internet. A restriction of the call duration can be provided for here.

Optionally, a recording of charging information can also be initiated in a step S14. Such charging information is transmitted in a step S15 to an appropriate charging service e.g. of a third party or of the operator of the network or system used for the authentication (step S15).

A random method can be used when selecting the password or the identifier, but it is also possible to use a memory containing a large number of terms from which one term is selected on a random basis in each case and transmitted via the authentication-capable network or system.

Alternatively or additionally, passwords can be preset, for example for airport officials at an airport, which passwords can be entered by subscribers as part of the authentication procedure either directly or, for example in the event of their having been forgotten, in order for it to be possible for them to be resent to them.

In summary, the subscriber or operator of a station WH to be connected to the wireless local area network WLAN enters instead of a password his/her mobile directory number (MSISDN) in the portal page, the authentication function generates a password and sends this password as an identifier by short message service SMS to a mobile radiocommunication terminal (GSM terminal). The subscriber transmits the password received to the station and can thus be uniquely authenticated by the authentication function in the service selection gateway SSG.

In this way, while the operator of the data network has only one telephone number as a possible unique assignment to the subscriber, a further assignment to the subscriber is possible, if needed, e.g. if personal address data is specified incorrectly by the station user, by means of an appropriate later access to the databases of the telecommunications system. By this means, the subscriber is ultimately, and in the most reliable and trustworthy manner currently known, also authenticated for the authentication function of the wireless local area network. Furthermore, it is possible to invoice the subscriber for any charging information via a charging service used as an intermediary, a corresponding charging organization or the operator of the mobile communications network. In particular, a fiduciary relationship has only to exist between the authentication server and the telecommunications network which was used as an intermediary for the authentication, but not between the subscriber and the operator of the data network.

A wallet server can also be used as an intermediary charging organization or charging service, which wallet server functions in the manner of a collection agency. The use of the mobile communications system hereinbefore is only a means to the end of authentication and is not intended to exclude any other type of network connection.

The authentication function and the access control function can be accommodated in one entity, e.g. a computer, but can also be provided separately in a central and/or multiple satellite devices. This is illustrated in the Figures by means of the division into a web server i-noc for carrying out the authentication and an access unit i-sat containing the access control unit. The radio access unit and the access control unit record among other things information for charging.

If the authentication function is set up in an independent device i-noc, such an authentication device i-noc can also supply multiple access control units i-sat. In particular, it is then advantageous to install the authentication device i-noc at a location close to or in an external network with a reliable independent authentication function or with the operator of a charging system, e.g. with the operator of the mobile communications network GSM or a broker. This enables provision of a costly authentication device i-noc at a central location and the connection of a large number of readily configured and cost-effective access control units i-sat in individual local networks WLAN or access points AP. Advisably, a secure IP-based connection conforming to e.g. RADIUS or HTTP-S (Hypertext Transmission Protocol-Secure) is established for the connection between separate access control units i-sat and an authentication device i-noc.

In addition to the transmission of charging information to a so-called wallet server, the charging information can also be transmitted directly to the operator for example of a mobile communications network used for the authentication; charging or payment platforms available there can be used. Payment platforms exist for example as intelligent network functions for micropayment solutions. Such a charging method is described below with reference to FIG. 4.

Figure 4:
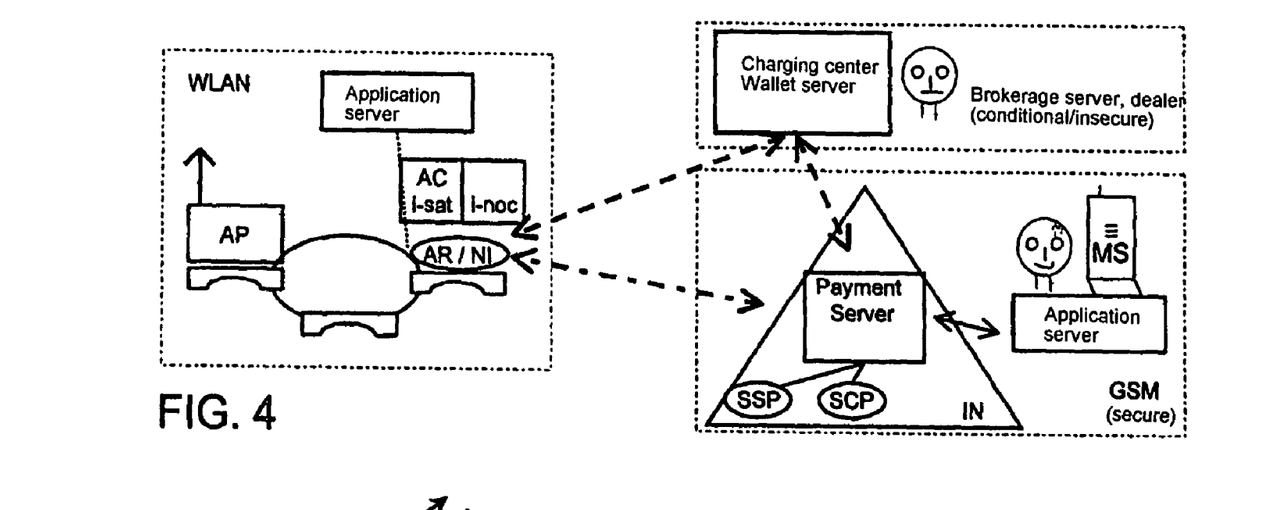
FIG. 4 shows an arrangement for charging.

Currently standard mobile communications networks have an intelligent network (IN) with the aid of which they can offer help services or supplementary services for their mobile telephony customers, e.g. call forwarding to a voice mailbox. These systems generally consist of a service switching point SSP and a service control point SCP. The former recognizes for example from the call number dialed that an IN service is required, the latter recognizes the required service and enables the provision and charging of the same. Service control points SCP are generally implemented on server platforms.

Mobile communications network operators can now give third parties access to this generally very complex system if third parties would like to offer their own services and to use the mobile communications network operator's payment system as a type of collection system, which is where the term micropayment stems from. To this end, the connection is provided to a payment platform or a payment server, the interface being based upon a simple, generally IP-based, protocol, rather than using complex protocols which conform for example with CCS7 or INAP. In such a system, however, exactly the same problem of trust arises as in the prior art. If the seller of services or of data network access connects to such a charging system and is at the same time a wholly owned subsidiary of a mobile communications network operator, then charging requests from the seller can be accepted. The seller is then given an account in the payment server. However, if the seller is not a trustworthy seller, e.g. an unknown data network operator, then a wallet server is generally used as an intermediary. This wallet server can then, in addition to banks or trustworthy sellers, transmit invoices direct to the mobile communications network operator's payment system or charging system.

To facilitate this, the web server in the embodiment hereinabove is supplemented by an appropriate extended network interface. By this means, charging information can be transmitted inserted in appropriate messages of the mobile communications collection system.

In order to be able to determine the end of the charging, an override can be made to IN services, for example a weather service, which enable a time-out.

Using the procedure and devices described hereinabove, a wireless local area network can autonomously carry out authentications of connected stations or of subscribers assigned to these stations, it being possible for authentication information to be used from various different networks and systems with appropriately secure authentication facilities. A mobile communications network operator can connect external suppliers of local area networks to its charging or payment system and thus with minimum outlay offer its own mobile communications customers access to local area networks without itself being compelled to provide access points and data networks. Furthermore, a mobile communications network operator can obtain access to local area networks for its customers even at locations where this service is already being offered by another third party, by selling or donating to this third party the necessary devices and software functions. Moreover, third-party operators, e.g. content providers can be motivated to offer access facilities to wireless local area networks themselves since these can also exploit the mobile communications network's facility for authentication and thus for collection.

Figure 5:
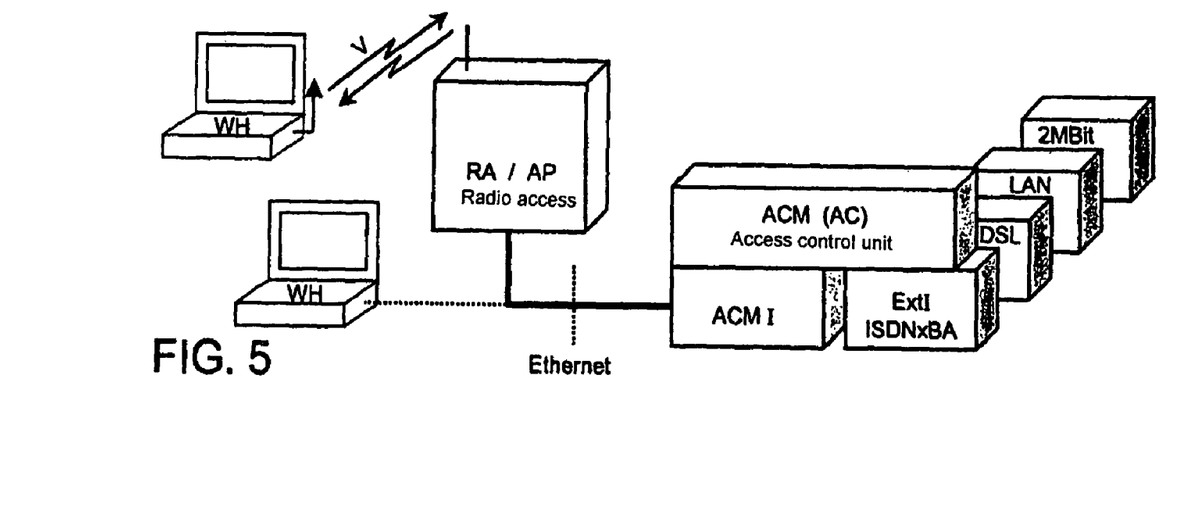
FIG. 5 shows a modular radio access point.

Referring to FIG. 5, a particularly preferred radio access point consists of a modular device. A radio element serves to connect external wireless stations to a wireless local area network conforming e.g. to the Ethernet standard. A modem element is also connected to the Ethernet line. The modem element has the devices and functions of the service selection gateway, i.e. the access control unit and function, a call or connection section and modularly replaceable interface devices for connecting to an external communications system or network. A modular device configured in this way conceals the service functionality, looks like a modem and offers, depending on the structural configuration, facilities for connecting to a large number of different types of communications systems and networks, such as e.g. ISDN or DSL. The aforementioned connection facilities serve not only the authentication described hereinabove, but also to provide an Internet access or other physical connections between the different types of systems. The various network types can thus be connected to the external interface, whereby access for sending short messages SMS to a mobile telephone in the GSM network can be via a 2 Mbit line of an interposed IP backbone.

What is claimed is:

1. A method for authenticated access by a station compatible with a data network, where access of the station is to an access point for such a data network, comprising:

transmitting identification information to the access point;

providing and transmitting a password via an interface to an authenticated device of a system or network external to the access point, having an authenticating function, whereby the identification information is directly assigned to the device authenticated in the external system or network and access to data of the authenticated device is available at a location of the station or of the access point;

transferring the password sent to the authenticated device from the authenticated device to the station;

based on the password received at the station, the station transmitting an attempted copy of the password to the access point;

comparing the attempted copy of the password received from the station by the access point with the password sent to the authenticated device; and if the comparison is positive, enabling access of the station to at least some services and functions at the access-point end or at the network end.

2. The method according to claim 1, wherein the password is randomly generated or is randomly selected from a list with a large number of redefined passwords or another entity at the access-point end or at the network end.

3. The method according to claim 1, wherein the transmission of the password is carried out by a short message service.

4. The method according to claim 1, wherein the transmission of the password is carried out by an indirect use of authentication functions in the system or network external to the access point or data network with the authenticated device.

5. The method according to claim 1, wherein a mobile station or a subscriber identification card of a cellular mobile radio communication system is used as the authenticated device of the system or network external to the access point or data network.

6. The method according to claim 1, wherein after authentication of the station compatible with the data network, the station accessing the access point to the data network, data relevant to charging is recorded at the access-point end or in a data network at the access-point end by the or an independent entity when the station accesses the access point, the data network and/or services.

7. The method according to claim 6, wherein in a first charging unit basic charging information is recorded and transmitted to a second charging unit which determines from the basic charging information charges to be billed.

8. The method according to claim 6, wherein the data relevant to charging is forwarded to an external charging entity of a third party or to a charging unit, interposed for authentication, of the system or network external to the access point or external to the data network, wherein either the third party and the charging unit are not involved in the authentication procedure or the authentication procedure is carried out independently of the charging method autonomously between the station and the access point or the entity at the access-point end.

9. The method according to claim 6, wherein charging information of a charging-relevant connection occurs as charging access to an IN-based payment system.

10. A data network, comprising:
at least one interface-type access point for access to the data network by stations compatible with the data network at the subscriber end;
an access control unit with an authentication memory in which authorized stations are registered; and
a first external network interface for access by the data network to an external system or network that is incompatible with the data network,
wherein the access control unit is configured to generate a password and to transmit the password via the external system or network to an authenticated device of the external network,
wherein the authenticated device is configured to provide the password to the station,
wherein, in response to receiving the password from the authenticated device, the station is configured to transmit an attempted copy of the password to the access control unit; and
wherein the access control unit is configured to compare the attempted copy of the password transmitted to the authenticated device with the password received from the station.

* * * * *